Aug. 19, 1947.  J. B. VERNON  2,425,904
TURBINE
Filed Nov. 29, 1941  5 Sheets-Sheet 1

INVENTOR.
JAMES B. VERNON
BY
Flournoy Corey.
ATTORNEY.

Aug. 19, 1947.   J. B. VERNON   2,425,904
TURBINE
Filed Nov. 29, 1941   5 Sheets-Sheet 2
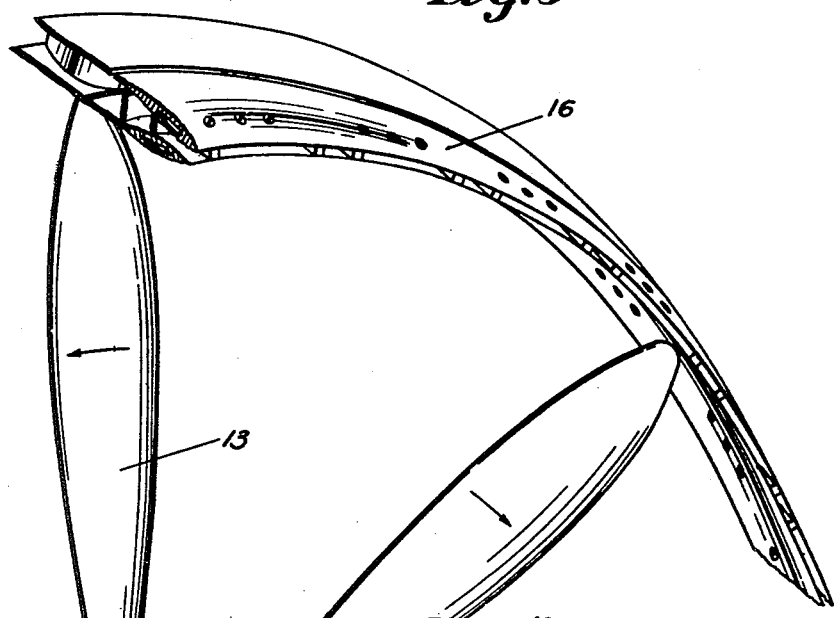
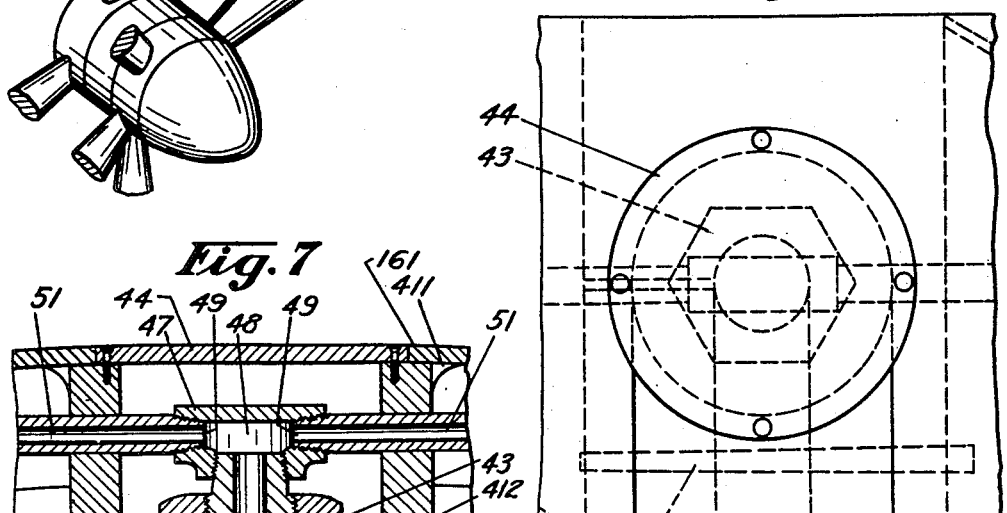
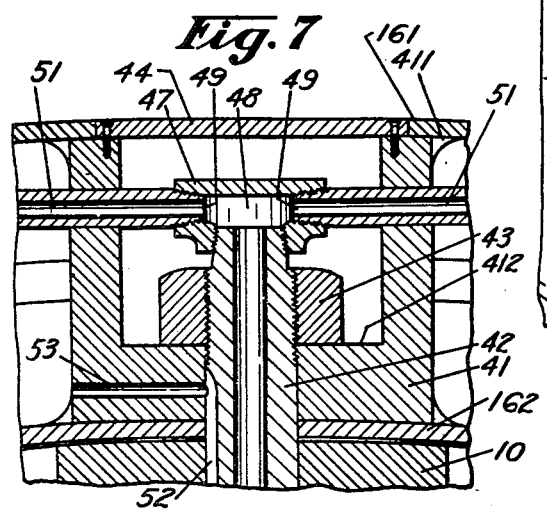
INVENTOR.
JAMES B. VERNON
BY Flournoy Corey
ATTORNEY.

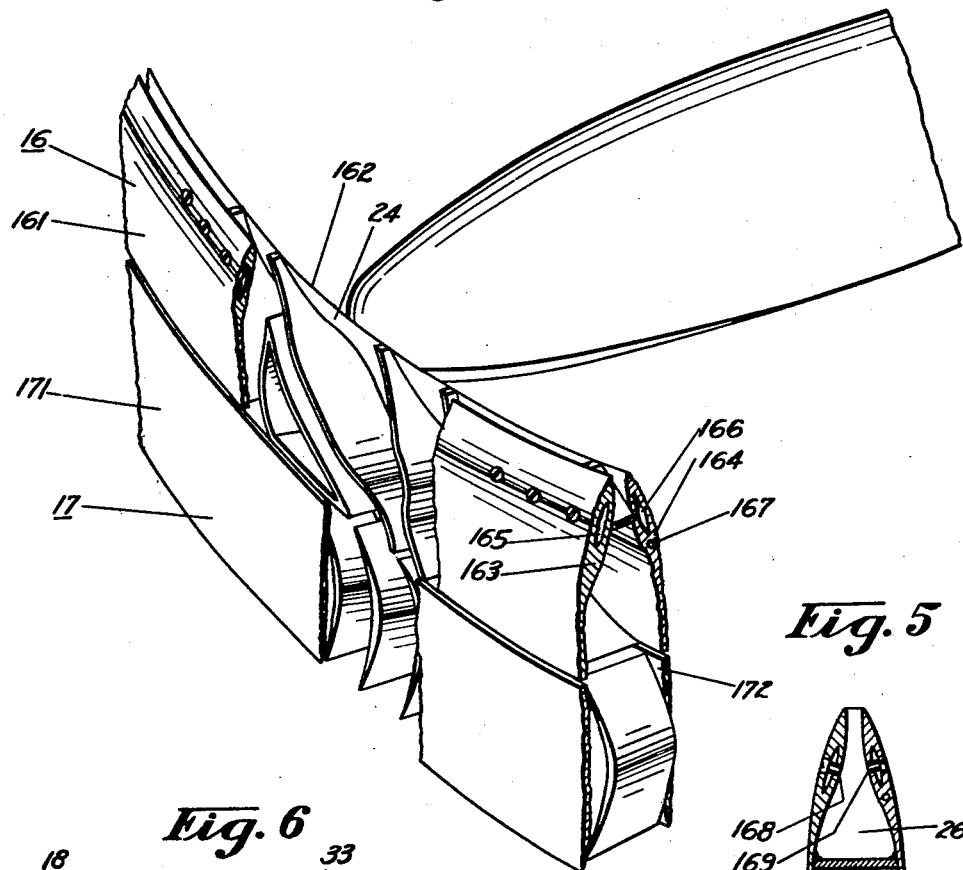
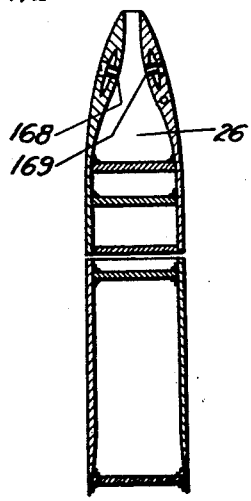
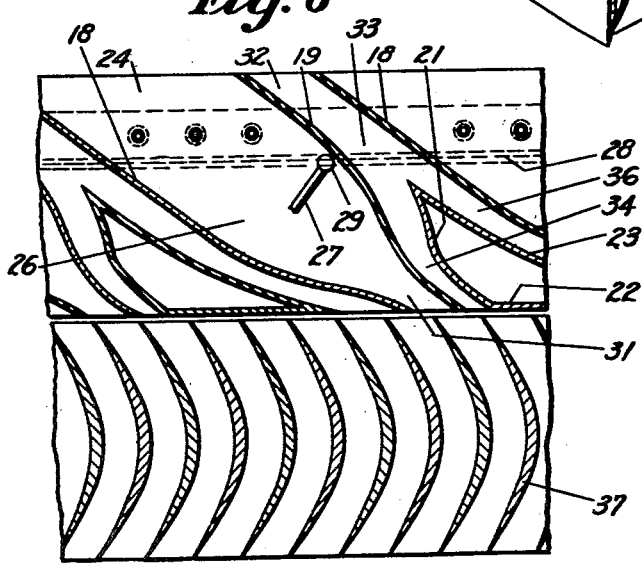

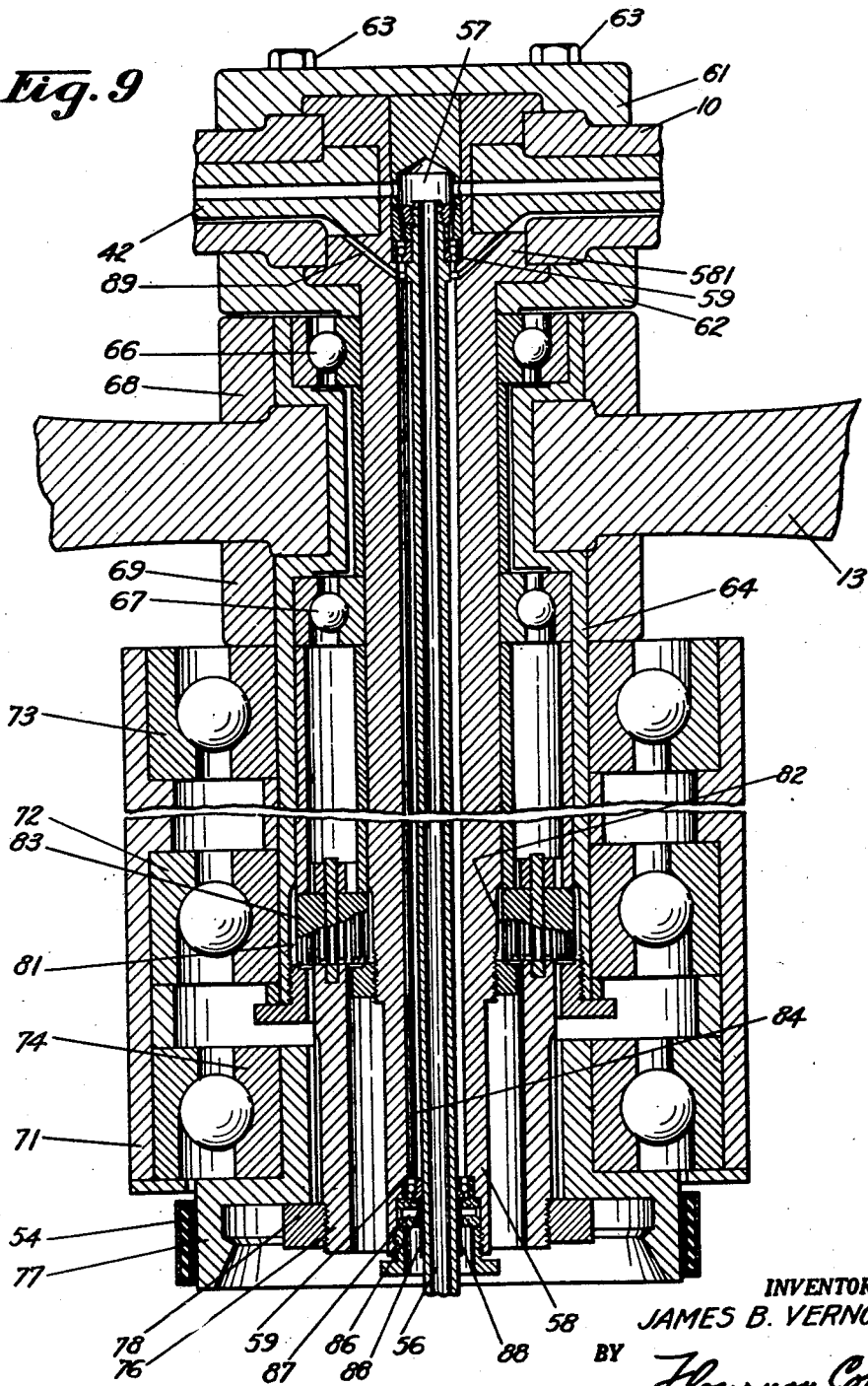

Aug. 19, 1947.  J. B. VERNON  2,425,904
TURBINE
Filed Nov. 29, 1941  5 Sheets-Sheet 5

INVENTOR.
JAMES B. VERNON
BY *Flournoy Corey.*
ATTORNEY.

Patented Aug. 19, 1947

2,425,904

UNITED STATES PATENT OFFICE 2,425,904

TURBINE

James B. Vernon, Marion, Iowa

Application November 29, 1941, Serial No. 420,971

5 Claims. (Cl. 170—135.5)

This invention relates to internal combustion engines and has particular relation to a gas turbine for driving aircraft propellers and for general power production.

In the production of power and more particularly in producing power for driving aircraft, the reduction of weight per unit of horsepower and the reduction of the number of moving parts is of course very desirable. I have provided a new concept of production of power for aircraft in providing a new internal combustion engine of the turbine type and combining this new engine with the propulsive members of the craft. I have thereby materially simplified the driving or power producing means and the means for applying this power to the propelling device such as the propellers of the aircraft.

The primary object of my invention therefore is to provide means for driving aircraft propellers and for general power production which shall be extremely simple in construction and having a minimum number of parts.

Another object of my invention is to combine the propelling means of aircraft such as the propeller with a gas turbine so as to utilize the forces set up in the revolving propellers for providing fuel for the engine.

Another object of my invention is to utilize the space occupied by the revolving propellers for housing and accommodating the propelling engine.

Still another object of my invention is to provide a new and novel propeller arrangement for aircraft.

Another object of my invention is to provide a new and novel means for utilizing both the reactive forces of a burning charge of gas and the forces generated by the expansion and movement of this charge.

Another object of the invention is to provide means for increasing the efficiency of propellers including rings on the ends of the propeller blades for directing the flow of air.

Another object of my invention is to provide means for utilizing the reactive forces of burning charges of gas for rotating one propeller, and the kinetic force of the burning charge for rotating another propeller and to provide means for coupling these propellers together.

Other and further features and objects of the invention will be more apparent to those skilled in the art upon a consideration of the accompanying drawings and following specifications, wherein is disclosed an exemplary embodiment of the invention, with the understanding, however, that such changes may be made therein as fall within the scope of the appended claims, without departing from the spirit of the invention.

In said drawings:

Figure 3 is a fragmentary view in perspective of portions of the two rings of the device shown in Figures 1 and 2, together with two of the propeller blades and the hubs thereof. Only one blade of each propeller is completely shown.

Figure 4 is a fragmentary view in perspective of smaller fragments of the two rings, with portions of the rings broken away to illustrate the chambers of the turbine.

Figure 5 is a view in transverse section through the two rings shown in Figure 4.

Figure 6 is a fragmentary view in longitudinal section of portions of the rings shown in Figures 1 to 5.

Figure 7 is a view in section illustrating the attachment of the front ring to the end of a propeller blade.

Figure 8 is a view taken from the outer face of a ring of the junction between the ring and a blade and illustrating the method of attachment thereof.

Figure 9 is a view in section of the driving means for selectively driving one propeller by rotation of the other.

Figure 1:
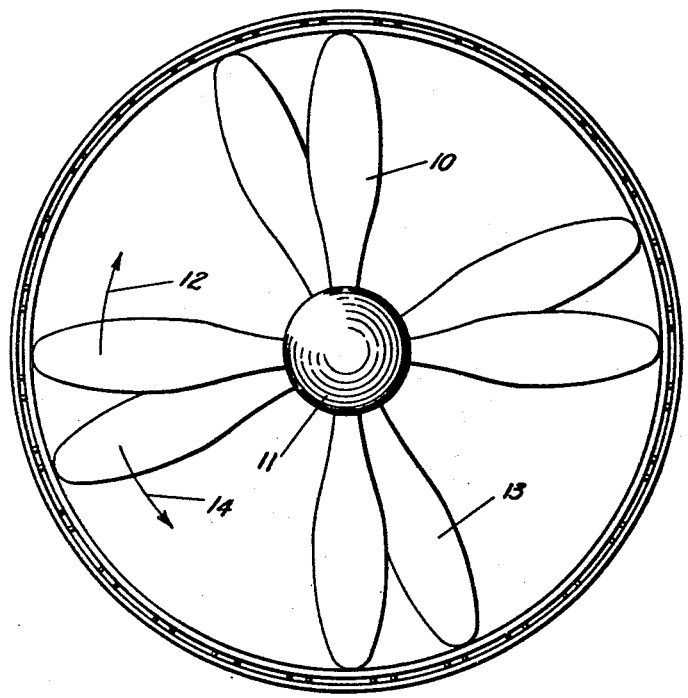
Figure 1 is a view in front elevation of a turbine constructed according to one embodiment of my invention and illustrating the power ring, the propellers and the spinner on the hub.
Figure 2:
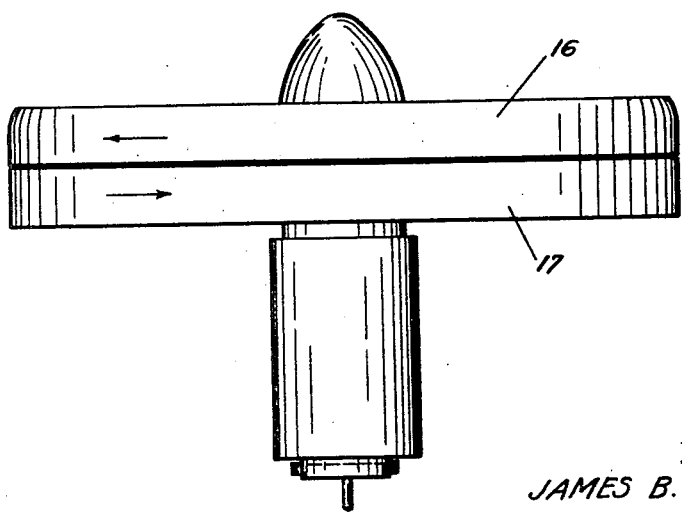
Figure 2 is a plan view of the structure shown in Figure 1, showing also the casing for the gearing connecting the propellers.

Referring now to the drawings, in practicing my invention I preferably utilize two four-bladed propellers as spokes of a wheel for mounting the turbine rings for rotation but, as later explained, it is not necessary in order to produce power to utilize propellers at all. The rings may be mounted on spokes like a wheel, with bores in the spokes for conducting gasoline to the propulsive rings. By using four-bladed propellers I am enabled to utilize rings of a lesser diameter than if, for instance, a two-bladed propeller were used, and it is of course possible to have portions of the propeller extend beyond the rings without departing from the spirit and scope of the invention.

In the embodiment of invention illustrated in Figure 1 a four-bladed propeller 10 is mounted on a hub within the spinner 11 and with the blade pitched so that rotation in the direction of the arrow 12 will produce movement of air through the circle of the propeller rotation from the front or spinner end of the device.

A second propeller, indicated at 13, is positioned behind the propeller 10 to rotate about the same axis as the propeller 10, but the pitch of the propeller blade 13 is in the opposite direction so that rotation in the direction of the arrow 14 will cause air to be driven backward through the propellers. The direction of the rotation of the propellers 10 and 13 is therefore opposite so that the effects of torque of the rotating masses is neutralized when the propellers rotate at the same speed, or minimized if they rotate at different speeds.

The ends of the blades of the propeller 10 are joined by a leading, or entering ring 16 and the blades of propeller 13 are joined by a trailing ring 17. In order to better distinguish between these rings and their functions I shall call the leading ring 16 the power ring, and the trailing ring 17, the turbine ring.

Now referring more particularly to Figures 3, 4, 5 and 6, both the power ring 16 and the turbine ring 17 are hollow, that is, side walls 161 and 162 form the continuous structure member of the ring 16, while the side walls 171 and 172 form the continuous structure of the ring 17. The front edges of the walls 161 and 162 are rounded toward each other and are slightly enlarged as indicated at 163 and 164, so as to provide channels of the proper form for compressing gas entering into the ring and for providing conduits 165 and 166 for introducing fuel into the chambers within the ring. A channel 167 is provided for an electrical conductor as hereinafter described.

Partitions 18, 19, 21, 22 and 23 are provided between the walls 161 and 162 of ring 16 to provide channels for the flow of air and gas through the ring. Air entering the slots 24 passes into the chamber 26 between partitions 18 and 19 and is slowed down by reason of the rotation of the ring through the air, that is, if the aircraft is in flight the air through which the craft is passing flows into slots 24 and is caused to attain the velocity of movement of the ring. The effect is the same as though the air was flowing past the ring and was slowed down on passing through the ring. The kinetic energy of the air flowing into the slots 24 is transformed into pressure energy, or air under pressure, and of course this pressure is greater than that of the surrounding atmosphere. Now gasoline is supplied through tubes, hereinafter described, in the propeller blades and this gasoline passes through the conduits 165 and 166 and through orifices, nozzles, or jets (168 and 169) by the action of centrifugal force induced by rotation of the propellers, and this gasoline is immediately vaporized in the air within the chamber 26 and it thus forms an explosive mixture.

Ignition of the mixture is secured by a hot wire such as that illustrated at 27. This hot wire is preferably of nichrome, is preferably streamlined and it is stretched across the chamber 26 and is grounded on the wall of the chamber. The current for heating the wire is brought through conductors indicated at 28 and 29.

The explosive mixture within the chamber 26 is thus ignited and because of its consequent expansion the products of combustion are discharged through the expulsion jets 31 at the rear of the power ring.

Air also flows into the power ring through slots 32 and through the channels 33 within the ring. The channels are formed by partitions 18 and 19 at their forward portions and each of the channels 33 are preferably divided into two channels as illustrated at 34 and 36 by means of partitions 21, 22 and 23. The air flowing through the channels 34 and 36 cools the walls 18 and 19 and the air discharged from the channels 34 and 36 flows on to the turbine ring to cool this ring.

The discharge of the products of combustion from the combustion chamber 26 produces a reactive force to drive the ring to the left, as viewed in Figure 6, to produce rotation of the propeller 10 in the direction indicated by the arrow 12 of Figure 1.

The products of combustion, by reason of their rapid expansion, attain considerable kinetic energy as they pass through the jets 31 and this kinetic energy is utilized by permitting the jet of gas to impinge on the buckets or blades 37, which join the side walls 171 and 172 of the turbine ring 17. The change of direction of the gas reacts upon the buckets 37 in accordance with the well known principle of turbine operation to drive these buckets to the right, as viewed in Figure 6, to produce rotation of the turbine ring 17 in a counter-clockwise direction as viewed in Figure 1. After the gas has passed through the channels between the buckets it is discharged through the rear edge of the turbine ring 17 and its reactive force is still of assistance in driving the ring 17 forward. Thus power generated by the burning of the atomized fuel is utilized to the fullest possible extent.

Figures 7 and 8 illustrate the means for fastening the propeller blades 10 and 13 to the combustion ring 16 and the power ring 17, the only difference being that a channel is provided longitudinally of the blades 10 for conducting gasoline from the propeller hub to the combustion ring 16. The side walls 161 and 162 of combustion ring 16 are welded or otherwise secured to a block 41 as indicated by the fillets at 411. A tube 42 passes longitudinally through the blades 10 and carries the gasoline to the ring. The nut 43 on this tube bears against the inner face 412 of the block 41 and thus secures the combustion ring 16 to the propeller blade 10. Access to the interior of block 41 is attained by means of the removable wall section 44. In order to permit the combustion ring to be readily slipped on the propeller ends, portions of block 41, indicated at 413, are cut out. After the ring is on the blade ends the blocks 413 are replaced and locked in place by means of the tapered pins 46.

The member 47 is a threaded cap for the end of the tube 42 and this member is hollow, as indicated at 48, and provided with ports, as indicated at 49, so that the gasoline thrown outward through the tube 42 passes into the cap 47 and out through the ports 49 into tubes 51 which carry the gasoline to the channels 165 and 166.

A slot 52 is milled in the outer wall of the tube 42 and the hole 53 drilled in the block 41 to contain the insulated current-carrying wire leading to the channels 167.

In Figure 9 I have illustrated the hub structure on which blades 10 and 13 are mounted and I have also illustrated in this figure a mechanism for driving one propeller by rotation of the other. This drive of one propeller by the other is optional and is controllable by means of a band brake 54, as will be hereinafter explained.

Gasoline enters the hub through the tube 56 and passes forwardly to a chamber 57 which connects with the channels in the tube 42, shown in Figure 7. Gasoline is thus caused to flow into the propeller hub and from there is driven outwardly by centrifugal force. The hollow shaft 58 rotates, relative to the tube 56, on the bearings 59. The shaft 58 is enlarged at its forward end, as indicated at 581, to permit the propeller blades 10 to be seated on the shaft.

The propeller blades are secured in place by means of the split retainers 61 and 62. The halves are secured together by means of bolts, the ends of which are indicated at 63. The hollow shaft 64 rotates on the shaft 58 by means of bearings 66 and 67 and the blades are retained in place on the shaft by means of split retainers 68 and 69. The hollow or quill shaft 64 rotates inside the housing 71 by means of the bearings 72 and 73 and it is this housing 71 which is secured to the aircraft and forms the base for the rotating masses of the propelling means.

Bearings 74 are provided to permit rotation of the tube 76 and clutch member 77 in the housing. The clutch members 76 and 77 may rotate freely or are stopped from rotation by means of the band brake or clutch indicated at 54. Members 76 and 77 are splined together and a retaining ring 78 holds the assembly in position.

An internal gear 81 is formed on the inner wall of the quill shaft 64 and an external gear 82 is formed on the outer wall of the hollow shaft 58.

A ring of planetary gears 83 are secured to the forward end of the cylindrical clutch member 76 and these planetary gears are in mesh with the external gear 82 and the internal gear 81. When the band clutch 54 is disengaged, the blades 10 and 13 may rotate freely with reference to one another and with reference to the housing 71, but when the band brake 54 is engaged, the planetary gears 83 furnish a drive connection between the hollow shaft 58, on which propeller 10 is mounted, and the larger hollow or quill shaft upon which the blades 13 are mounted.

Thus the blades 13 will be positively rotating in one direction if the blades 10 are rotating in the other direction. The slot 84 on the inner wall of the hollow shaft 58 is adapted to accommodate the insulated wire which carries the current to the blade tips. It is connected to a carbon brush 86 contained in a plastic ring 87 and makes contact with an insulated ring 88 on the stationary tube 56. The wire in slot 84 passes outwardly to the blade tips through the conduit 89 and the milled slot 52 where it is connected with the hot wire 27.

While I have described the present device as it would probably be constructed in use as a propelling means for aircraft and the like, it is quite within the scope of my invention to utilize these principles in furnishing power as a stationary power generating means. The rings containing the combustion chamber and the turbine buckets could be attached to the outer periphery of two discs instead of a propeller and the whole enclosed in a housing. The shaft could then be attached to a generator or rotating device to furnish power as desired.

Figure 10:
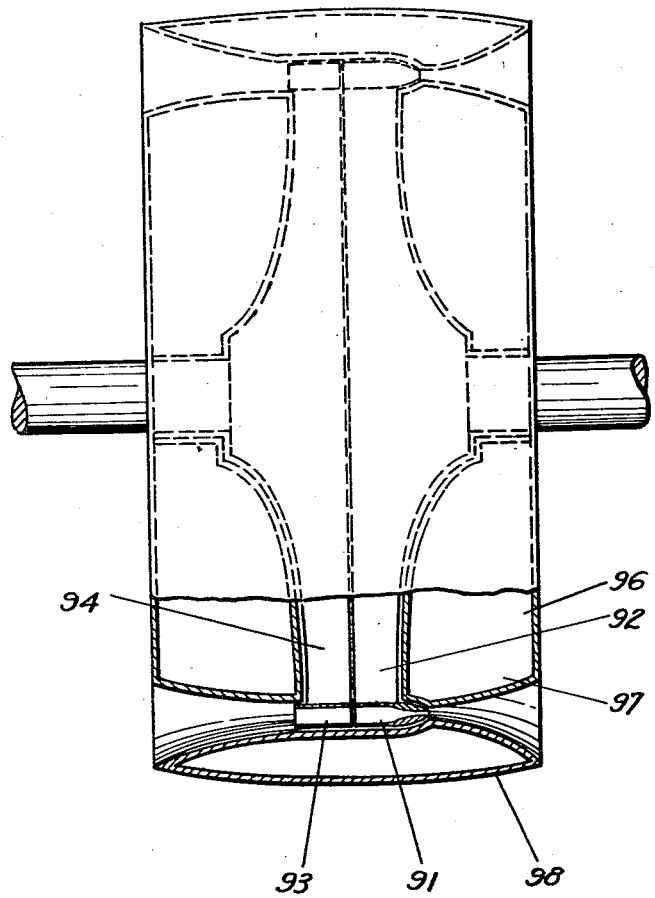
Figure 10 is a view partly in section and partly in elevation showing a modification of the invention in which a fixed stator is employed so the device may be used as a stationary power plant.

In Figure 10 I have shown one embodiment of such a device in which the combustion ring 91 is mounted on a disc 92 and the power or turbine ring 93 is mounted on a disc 94. The housing 96 is curved, as indicated at 97, as is the outer housing ring 98, to direct air or gas into the slots of the combustion ring and carry away the spent products of combustion.

Some of the advantages of my invention are that a device constructed according to my invention is lighter and simpler than the conventional aircraft engine.

As a gas turbine the combustion air does not require a separate compressor as is the case with a conventional gas turbine. The combustion chambers themselves compress the air.

The cooling problem encountered in gas turbines is taken care of by the atmosphere directly, both for the combustion chambers and the blades. Part of the cooling is done by the atmosphere directly on the external surfaces of the rings. The rest is taken care of by allowing air to flow between the combustion chambers and onto the turbine buckets. Because of the simplicity of this machine it should be easier to manufacture and therefore more economical, and it should also be more reliable in operation and thereby eliminate accidents due to motor failure.

Although I have described a specific embodiment of my invention it is apparent that modifications thereof may be made by those skilled in the art. Such modifications may be made without departing from the spirit and scope of my invention as set forth in the appended claims.

I claim as my invention:

1. In an aircraft propelling means, a power ring consisting of a series of combustion chambers formed by relatively flat walls of the ring being tapered towards each other and having angular partitions therein, a turbine adjacent to the power ring, gearing means driven by said turbine and a propeller connected with said gearing means, and means to disengage the turbine from its connection with the gearing means.

2. In an aircraft propelling means, two propellers geared together to rotate in opposite directions, a combustion ring on the leading propeller having a slot at the forward end thereof for the admission of air into the combustion ring and having nozzles for directing the products of combustion angularly with respect to the direction of rotation of the combustion ring and rearwardly therefrom, a power ring on the trailing propeller having buckets curved to change the direction of flow of the products of combustion discharged from the combustion ring and thereby impart propelling effect to the power ring and at the same time utilize the repulsion effect of fuel discharged from the combustion ring, the flow of air and products of combustion being from front to rear and at right angles to the plane of the propeller blades.

3. In an aircraft propelling means, a power ring, said ring comprising spaced side walls which taper at their forward edges to form a circumferential slot, partitions spaced between and secured to the sidewalls of the ring to form a series of combustion chambers, a turbine ring mounted adjacent said power ring and coaxial thereof, said turbine ring consisting of parallel side walls between which are mounted a series of vanes to form pockets, discharge openings leading from the respective combustion chambers of the power ring to communicate with the pockets of the turbine ring, two propellers adapted to rotate in opposite directions by the reaction between the power and turbine rings, means securing said power ring and said turbine ring to said propellers, respectively, and gearing means connected with said propellers for causing them to rotate in opposite directions.

4. In an aircraft propelling means, a pair of contra-rotatable propellers, a power ring comprising a pair of concentric walls disposed about said propellers coaxially thereof, means for securing the inner of said pair of walls to one of said propellers, means for securing said concentric walls together in spaced apart relation comprising partitions forming diagonal channels therebetween, means for conducting fuel to certain of said channels and means for burning the fuel therein, a turbine ring disposed axially adjacent said power ring and also comprising a pair of concentric walls disposed coaxially of said propellers, the inner wall of the turbine ring being secured to the other of said propellers, and partitions forming channels between the walls of the said turbine ring, said turbine being disposed immediately rearwardly of said power ring so as to receive the gases of combustion from said power ring and said partitions in the turbine ring being shaped to form curved channels, and means gearing said power ring and said turbine ring together so as to rotate in opposite directions at a substantially constant ratio.

5. In a gas turbine, a pair of propellers mounted on concentric axes and pitched for rotation in opposite directions, a combustion ring mounted on one of said propellers and a power ring with buckets mounted on the other of said propellers, the combustion ring consisting of spaced apart, generally cylindrical walls, tapering radially toward one another at their forward edges to provide combustion chambers therebetween and to provide slots to direct air into said combustion chambers, means for mixing fuel with said air, means for igniting the mixture of fuel and air and means for discharging the products of combustion in a direction to rotate said one propeller, means securing one wall of the combustion ring to the ends of said one propeller, and means for fixing the power ring to the said other propeller adjacent the said means for discharging products of combustion from said combustion ring, whereby the gasses discharged from the combustion ring drive the buckets to rotate the said other propeller in the opposite direction.

JAMES B. VERNON.

REFERENCES CITED

The following references are of record in the file of this patent:

UNITED STATES PATENTS

| Number | Name | Date |
|---|---|---|
| 2,272,676 | Leduc | Feb. 10, 1942 |
| 1,003,708 | Coleman | Sept. 19, 1911 |
| 1,995,467 | Bongiovanni | Mar. 26, 1935 |
| 206,734 | Jacker | Aug. 6, 1878 |
| 1,879,142 | Egan | Sept. 27, 1932 |
| 1,205,016 | Ramsey | Nov. 14, 1916 |
| 1,809,271 | Goddard | June 9, 1931 |
| 2,088,802 | McLaughlin | Aug. 3, 1937 |
| 1,431,683 | Ramsay | Oct. 10, 1922 |
| 2,281,203 | Pitcairn | Apr. 28, 1942 |
| 2,024,274 | Campini | Dec. 17, 1935 |
| 2,256,198 | Hahn | Sept. 16, 1941 |
| 2,326,072 | Seippel | Aug. 3, 1943 |
| 2,160,281 | Price | May, 1939 |

FOREIGN PATENTS

| Number | Country | Date |
|---|---|---|
| 383,966 | France | Jan. 23, 1908 |
| 275,677 | Great Britain | Mar. 22, 1928 |
| 366,450 | Great Britain | Mar. 3, 1932 |
| 409,379 | France | Feb. 17, 1910 |
| 415,895 | France | July 25, 1910 |
| 409,379 | France | Feb. 7, 1910 |
| 665,954 | Germany | Oct. 6, 1938 |
| 439,805 | Great Britain | Dec. 6, 1935 |
| 537,473 | Great Britain | June 24, 1941 |
| 469,180 | Great Britain | July 20, 1937 |
| 9,413A | Great Britain | Apr. 23, 1907 |
| 830,740 | France | May 23, 1938 |